Oct. 4, 1966  HARUO TESHI ET AL  3,276,649
MOTION-PICTURE PROJECTOR OF AUTOMATIC LOADING TYPE
Filed Nov. 4, 1964  2 Sheets-Sheet 1

Haruo Teshi and
Takashi Fujii
Inventors

By Wenderoth, Lind and Ponack
Attorneys

> United States Patent Office 3,276,649
Patented Oct. 4, 1966

3,276,649
MOTION-PICTURE PROJECTOR OF AUTOMATIC LOADING TYPE
Haruo Teshi and Takashi Fujii, Nagoya, Japan, assignors to Elmo Company Limited, Nagoya, Japan
Filed Nov. 4, 1964, Ser. No. 408,794
Claims priority, application Japan, Nov. 13, 1963, 38/60,631; Mar. 12, 1964, 39/13,526
2 Claims. (Cl. 226—91)

This invention relates to a motion picture projector of automatic loading type.

There has been heretofore known motion picture projectors of automatic loading type wherein a roll of motion picture film is first loaded along a movable loop forming member and then the loop forming member is moved away from the film to provide for the film a slack required for intermittently transporting the film in the projection cycle.

In most of such projectors, a film path along which the loaded motion picture film is moving in the projection cycle includes a movable, loop forming member disposed in a predetermined position along the same on the outside of a film loop normally formed, and a stationary film guiding member disposed on the inside of the film loop. The movable loop forming member can be moved, in the outward direction, away from the film loop to form a free film loop. If, in this case, the loop forming member in its position remote outwardly from the film path before the motion picture film is loaded in the projector then the free film loop in a predetermined shape will not be formed resulting in a fear of damaging the film. To avoid the damages to the film, there has been already proposed a movable, loop forming member having its portion serving to prevent the free end of the film from advancing by means of a drive sprocket wheel provided that the member is in its position remote outwardly from the film path. Alternatively, means have been provided for forcing the film outside the region of the periphery of the sprocket wheel thereby to prevent further movement of the film.

It will be readily understood that a mechanism for moving the loop forming member away from the film path in the projection state to permit free jumping movement of the film due to intermittent transportation are inherently different from a mechanism for preventing the film from being loaded in the projector unless the latter is ready for loading a roll of film. It is highly desirable to provide simple control means adapted to serve as both the mechanisms just described.

An object of the invention is, accordingly, to provide an improved motion picture projector of automatic loading type simple in construction, inexpensive to manufacture and reliable in operation by the provision of simple movable control means for permitting a roll of motion picture film to be automatically loaded in place in their one position and then a free film loop required for projection to be formed through movement of the control means from their one position to their other position and preventing loading of the film roll in their other position.

As will be understood, the best shape of a film path along which a motion picture film extends in the loading cycle does not necessarily coincide with the best shape of film loop required for projecting the film. More specifically, upon loading a roll of motion picture film, it is desirable to extend the film along a smooth path having a radius of curvature as high as possible in order to introduce the leading end portion of the film in a film gate and other necessary portions without any damage to the film. On the other hand, in the projection cycle it is desirable to form a free film loop having a somewhat smaller radius of curvature for the reasons that the surface of the film is prevented from contacting the adjacent surface of the film loop forming unit due to the intermittent movement of the film resulting in a damage to the film and that pressure contacting of that portion of film travelling past the film gate with an aperture plate or a pressure plate naturally originating from the curvature of the film can be effectively utilized.

According to the conventional methods of moving a loop forming member outwardly to form a free film loop, that portion of the film loop jumping at a maximum amplitude in the projection cycle is determined by the position of the same film portion occupied upon loading. Therefore, if the shape of the free film loop is chosen to be preferable for projection, a film path formed upon loading will have rather a smaller radius of curvature. On the contrary, if a film path for loading is chosen to be desirable the free film loop for projection will inevitably tend to become too large in radius of curvature.

Another object of the invention is to eliminate the disadvantage just described.

With the above cited objects in view, the invention resides in a motion picture projector of automatic loading type comprising a sprocket wheel for transporting a motion picture film, a stationary, film loop forming member operatively coupled to the sprocket wheel, a controlling and mounting plate member rockably secured on a shaft for the sprocket wheel, a pair of film guiding roller members rotatably mounted on the controlling and mounting plate member on the entrance and exit sides of the sprocket wheel respectively, and means for moving the controlling and mounting plate member between its one position in which a roll of motion picture film is permitted to be automatically loaded in place and its other position remote away from the film loop forming member in which a free film loop is formed by displacement of the film guiding roller member on the exit side of the sprocket wheel, and a roll of motion picture film is prevented from being loaded by displacement of the film guiding roller member on the entrance side of the sprocket wheel.

In a preferred embodiment of the invention, a motion picture projector of automatic loading type comprises a pair of vertically spaced sprocket wheels for transporting a motion picture film, a stationary, film loop forming member operatively coupled to each of the sprocket wheels, a controlling and mounting plate member rockably mounted on a shaft for each sprocket wheel, a pair of film guiding roller members rotatably mounted on the controlling and mounting plate member on the immediate entrance and exit sides of the associated sprocket wheel, the controlling and mounting plate members having two positions, in one of which a roll of motion picture film is permitted to be automatically loaded in place and in the other of which a free film loop is formed by displacement of one of the film guiding roller members while a roll of motion picture film is prevented from being loaded due to displacement of other film guiding roller member in the film path with the plate member remote from the associated film loop forming member, an interlocking rod for connecting the upper and lower controlling and mounting plate members, spring means for biasing the lower controlling and mounting plate member to its one position, and control lever means adjacent the lower controlling and mounting plate member including a portion engaged by and disengaged from the lower controlling and mounting plate member and having another pair of film guiding roller members rotatably mounted thereon and engageable with a loaded motion picture reel, the other pair of film guiding roller members being responsive to the tension of the loaded motion picture film exceeding a predetermined magnitude to disengage the control lever means from the lower controlling and mounting plate member thereby to move the same and hence the upper controlling plate member through the interlocking rod to their other position.

The invention will become more readily apparent from the following detailed description taken in conjunction with the accompanying drawings in which.

Figure 1:
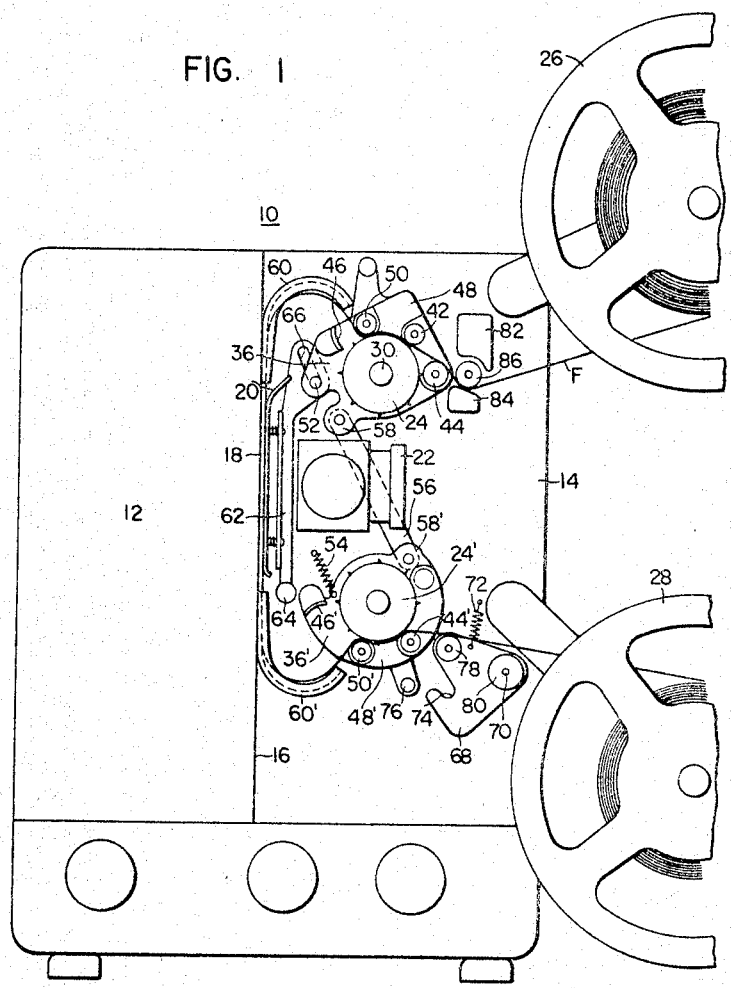
FIG. 1 shows a side elevational view of a motion picture projector embodying the teachings of the invention and illustrated in the projection state with a side cover removed for purposes of clarity.

Referring now to the drawings and more particularly to FIG. 1, there is illustrated a motion picture projector of automatic loading type constructed in accordance with the teachings of the invention. The projector illustrated comprises a housing generally designated by the reference numeral 10 and divided into two compartments or a lamp house 12 and a machinery chamber 14 by a vertical partition wall represented by vertical solid line 16. The partition wall 16 is provided on the central portion with a film window or aperture 18 facing an apertured pressure plate 20 resiliently supported in a manner as will be described hereinafter to be capable of forming therebetween a narrow gap sufficient to permit a motion picture film F to intermittently pass through the gap. In the machinery chamber 14 a projection lens generally designated by the reference numeral 22 is suitably disposed in spaced and aligned relationship with respect to the apertured pressure plate 20 on the side thereof remote away from the film aperture for the purpose of projecting a scene on a frame of the film F onto a projection screen (not shown). The machinery chamber 14 further includes a pair of vertically spaced sprocket wheels 24 and 24' for transporting the film F. The sprocket wheels 24 and 24' cooperate with a pawl (not shown) disposed adjacent the film aperture 18 to intermittently transport the film F. A pair of feed and taking up reels 26 and 28 respectively are suitably supported on the righthand, upper and lower corners of the housing 10 as viewed in FIG. 1. The components above described are of the conventional type.

According to the teachings of the invention a controlling and mounting plate member on which various control components are mounted is operatively associated with each of the driving sprocket wheels as above described.

Figure 3:
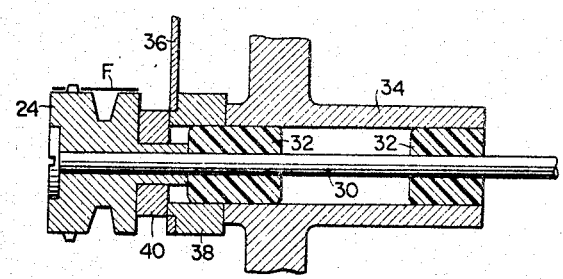
FIG. 3 shows a section taken along the line III—III of FIG. 2.

Referring to FIG. 3, one of the sprocket wheels, for example, the upper sprocket wheel 24 is rigidly secured on a shaft 30 which, in turn, is rotatably supported by a pair of suitable bearings such as nylon bearings 32 fitted into an elongated bearing case 34 suitably fixed in the chamber 14. A controlling and mounting plate member generally designated by the numeral reference 36 is rotatably mounted on the shaft 30 by having its boss 38' fitted onto the nylon bearing 32 with a collar 40 interposed between the same and the sprocket wheel 24.

Figure 2:
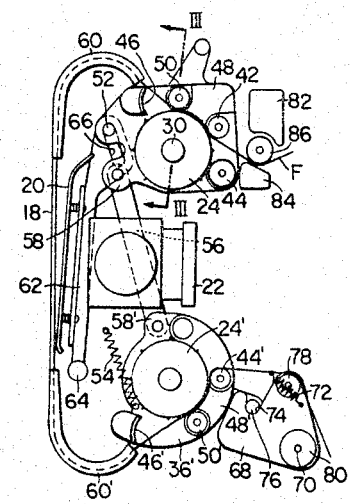
FIG. 2 shows a fragmental side elevational view of the projector illustrated in FIG. 1 in the loading state.

As shown in FIGS. 1 and 2, the controlling and mounting plate member 36 has a first guide roller 42 and an inlet guide roller 44 rotatably disposed thereon on the entrance or oncoming side of the sprocket wheel 24 and also a film deflector or guide element 46 riveted or otherwise secured thereto on the exit or off-running side of the sprocket wheel 24. A sprocket cover member 48 is rigidly secured to the mounting plate 36 to partially enclose the sprocket wheel 24 and has an end portion adjacent which a second guide roller 50 is rotatably mounted on the plate. The controlling and mounting plate 36 has a free end near to the vertical partition wall 16 and provided with a pin 52 for the purpose as will be apparent later.

The lower sprocket wheel 24' which is preferably substantially aligned with the upper sprocket wheel 24 in the vertical direction is operatively associated with another controlling and mounting plate member mounted on a shaft for the lower sprocket wheel 24' in the same manner as previously described in conjunction with the upper plate 36 and having disposed thereon various guide rollers, a film guiding element and a sprocket cover substantially identical in construction and operation with those disposed on the upper plate. Therefore the controlling and mounting plate member and the just mentioned components associated with the lower sprocket wheel are designated by the same reference numerals with prime as those associated with the upper sprocket wheel. For example, the reference numeral 42' designated a first guide roller disposed on the right-hand side of the lower sprocket wheel 24' as viewed in FIG. 1.

It is to be noted that in the lower plate 24' a pin such as 52 is omitted and instead a tensioning spring 54 having one end suitably fixed in the machinery chamber 14 is engaged at the other end by the plate 36' to bias normally the same to its one position which may be called hereinafter its projection position (see FIG. 1).

In order that both the upper and lower plate members 36 and 36' can interlock with each other an interlocking rod represented by dotted line 56 shown in FIGS. 1 and 2 is provided for pivotably connecting an intermediate lower projection 58 on the upper plate 36 to the corresponding projection 58' on the lower plate 36'.

Disposed between the exit or entrance side of each sprocket wheel 24 or 24' and the associated end of the film aperture 18 is a stationary film guiding channel 60 or 60' having a radius of curvature suitable for loading the film. Both the channels are open on the insides or the sides facing each other throughout the length.

In order to move the pressure plate 20 toward and away from the film aperture 18, a toggle mechanism is provided including an operating arm 62 rockable about its fulcrum 64. The operating arm 62 carries resiliently the pressure plate 20 on that side near the film aperture 18 and has a relatively enlarged free end portion on which a slide slot 66 is provided. The pin 52 on the upper control plate 36 is slidably inserted into the slide slot 66. With the arrangement illustrated, it will be appreciated that the operating arm 62 in its position illustrated in FIG. 2 maintains the pressure plate 20 relatively remote away from the film aperture 18 to form a relative wide spacing therebetween to permit the end portion of the film F to freely pass through the spacing, whereas the operating arm in its position illustrated in FIG. 1 serves to slidably sandwich the film between the film aperture 18 and the pressure plate 20.

In order to automatically move the upper and lower plates 36 and 36' from its one position illustrated in FIG. 2 to its other position illustrated in FIG. 1 in response to the tension of the film F exceeding a predetermined magnitude, an operating lever device 68 is preferably disposed below and at the right of the lower controlling plate 36' (as viewed in FIG. 1) for rocking movement about its pivot pin 70 and tends to rotate in the clockwise direction as viewed in FIG. 1 by a tensioning spring 72 having one end suitably fixed in the machinery chamber 14. The lever device 68 has a reentrance portion 74 adapted to engage a projection 76 formed on the lower control plate 36' in the loading cycle as shown in FIG. 2. The lever device is also provided with a pair of spaced guide rollers 78 and 80 rotatably mounted thereon. The roller 80 is preferably mounted on the pivot pin 70.

Further, a side wall portion 82 and a film guide piece 84 are provided in spaced and opposed relationship on the right of the upper controlling and mounting plate 36 with a guide roller 86 disposed therebetween. The guide piece and roller 84 and 86 form an initial film path along which a leading end portion of a film roll mounted on the feed reel 26 can reach the first guide roll 42. It is to be noted that the side wall portion 82, and the guide piece and roller 84 and 86 are located in such a manner that, in the loading position, a leading end portion of a film roll mounted on the feed reel 26 can easily engage the upper sprocket wheel 24 after it has passed through the film path just described whereas, in the projection position, they cooperate with the inlet and first guide rollers 44 and 42 to prevent the leading end portion of the film roll from engaging the sprocket wheel 24.

It is now assumed that all the movable components as previously described are in their respective positions as illustrated in FIG. 2 in order to automatically load a roll of motion-picture film in the projector. Under these circumstances, the leading end portion of the film roll mounted on the feed reel 26 can pass through the film path between the guide piece and roller 84 and 86 and thence from the underside of the first guide roller 42 toward the sprocket wheel 24 until it is engaged by the teeth on the upper sprocket wheel. The wheel 24 can now rotate to pass the end portion of the film F around the underside of the second guide roller 50 to the film guide element 46. Then the leading end portion of the film F deflects its direction by the guide element and passes through the curved upper stationary channel 60 to the relatively wide spacing between the film aperture 18 and the displaced pressure plate 20. The film travels downwardly through the spacing by a film transportation device (not shown).

The film F leaving that spacing passes through the curved lower, stationary channel 60' to the lower film guiding element 46'. After abutting against the element 46', the free end of the film F deflects its direction of movement and passes over the third guide roller 50' to the lower sprocket wheel 20'. The end portion of the film F engaging the sprocket wheel 24' moves along the inner surface of the lower sprocket cover 48' and advances from the upper side of the outlet guide roller 44' toward the right as viewed in FIG. 2.

When the free end of the film F reaches the guide roller 80 through the guide roller 78 that portion of the film disposed between the rollers 78 and 80 can be manually tensioned. Alternatively this tensioning of the film may be effected by utilizing a variation or an increase in the tension of the film upon winding the free end portion of the film on the taking up reel 28.

The increased tension of the film portion between the guide rollers 78 and 80 effects downward and leftward movement of the roller 78 thereby to cause counterclockwise movement as viewed in FIG. 2 of the operating lever device 68 against the action of the spring 72 until the lever device reaches its position illustrated in FIG. 1. With the lever located in its position illustrated in FIG. 1, the projection 76 on the lower control plate 36' disengages from the reentrance portion 74 on the lever device 68. This causes clockwise movement as viewed in FIG. 2 of the controlling plate 36' by the action of the spring 54 until the plate reaches its position illustrated in FIG. 1. Simultaneously the upper controlling plate 36 effects counterclockwise movement as viewed in FIG. 2 through the connecting rod 56 until the plate reaches its position illustrated in FIG. 1. Thus the rollers 50 and 50' are moved away from the associated channels 60 and 60' respectively thereby to form the respective free film loops (which are represented by solid lines in FIG. 1) suitable for the projection operation. Also the pressure plate 20 is moved toward the film aperture 18 to press the film against the film aperture 18 under a suitable pressure. In this way an automatic loading operation has been completed.

Once the free film loop required for the projection operation has been formed as shown in FIG. 1, the controlling plate 36 has been moved in the clockwise direction and the inlet guide roller 44 blocks the film path along which a film can be moved toward the sprocket wheel 24. This blocking effect of the roller 44 cooperates with side wall portion 82 and a guide element 84 and 86 to ensure that the sprocket wheel 24 can not engage a film to be loaded thereby to prevent a roll of film from being erroneously loaded.

It will be appreciated that the upper and lower controlling plates 36 and 36' are permitted to be rotated through a relatively large angle thereby to form film paths along which a film to be loaded can easily advance. In addition the magnitude of rotational movement of the plates 36 and 36' can be properly selected to form the optimum free loops for projection in extremely easy manner.

What we claim is:

1. In a motion picture projector of automatic loading type comprising a sprocket wheel for transporting a motion picture film, and a stationary film loop forming member operatively coupled to said sprockel wheel, the combination of a controlling and mounting plate member rockably secured on a shaft for the sprocket wheel, a pair of film guiding roller members rotatably mounted on the controlling and mounting plate member on the immediate entrance and exit sides of said sprocket wheel respectively, and means for moving said controlling and mounting plate member between its one position in which a roll of motion picture film is permitted to be automatically loaded in place and its other position remote away from said film loop forming member in which a free film loop is formed by displacement of said film guiding roller member on the exit side of said sprocket wheel, and a roll of motion picture film is prevented from being loaded by displacement of said film guiding roller member on the entrance side of said sprocket wheel.

2. In a motion picture projector of automatic loading type comprising a pair of vertically spaced sprocket wheels for transporting a motion picture film, and a stationary, film loop forming member operatively coupled to each of the sprocket wheels, the combination of a controlling and mounting plate member rockably mounted on a shaft for each sprocket wheel, a pair of film guiding roller members rotatably mounted on said controlling and mounting plate member on the immediate entrance and exit sides of the associated sprocket wheel, said controlling and mounting plate members having two positions, in one of which a roll of motion picture film is permitted to be automatically loaded in place and in the other of which a free film loop is formed by displacement of one of said film guiding roller members while a roll of motion picture film is prevented from being loaded due to displacement of the other film guiding roller member in the film path with said plate member remote from the associated film loop forming member, an interlocking rod for connecting the upper and lower controlling and mounting plate members, spring means for biasing said lower controlling and mounting plate member to its one position, and operating lever means adjacent said lower controlling and mounting plate member including a portion engaged by and disengaged from said lower controlling and mounting plate member and having another pair of film guiding roller members rotatably mounted thereon and engageable with a loaded motion picture reel, said other pair of film guiding roller members being responsive to the tension of the loaded motion picture film exceeding a predetermined magnitude to disengage said operating lever means from said lower controlling and mounting plate member thereby to move the same and hence the upper controlling plate member through the interlocking rod to their other position.

References Cited by the Examiner

UNITED STATES PATENTS

| | | | |
|---|---|---|---|
| 2,420,587 | 5/1947 | Dietrich | 226—91 X |
| 3,029,686 | 4/1962 | Bernzott | 226—91 |
| 3,122,965 | 3/1964 | Michaels | 226—91 X |
| 3,137,199 | 6/1964 | Townsley | 226—91 X |
| 3,137,200 | 6/1964 | Michaels | 226—89 X |
| 3,201,020 | 8/1965 | Cherniavskyj et al. | 226—91 |

M. HENSON WOOD, Jr., *Primary Examiner.*

V. C. WILKS, *Assistant Examiner*